May 8, 1956  E. EDERA ET AL  2,744,423
AUTOMATIC BORING MILL

Filed Aug. 6, 1952  3 Sheets-Sheet 1

INVENTORS.
EUGENE EDERA &
S. R. JOHN STOKVIS.
BY
their ATTORNEYS.

May 8, 1956   E. EDERA ET AL   2,744,423
AUTOMATIC BORING MILL

Filed Aug. 6, 1952   3 Sheets-Sheet 2

INVENTORS.
EUGENE EDERA &
S. R. JOHN STOKVIS.
BY
their ATTORNEYS

May 8, 1956

E. EDERA ET AL 2,744,423

AUTOMATIC BORING MILL

Filed Aug. 6, 1952

INVENTORS
EUGENE EDERA &
S. R. JOHN STOKVIS
BY

*their* ATTORNEYS

United States Patent Office 2,744,423
Patented May 8, 1956

2,744,423
AUTOMATIC BORING MILL

Eugene Edera and Samuel Raphael John Stokvis, Great Neck, N. Y.

Application August 6, 1952, Serial No. 302,942

4 Claims. (Cl. 77—57)

This invention relates to an automatic boring mill, and has particular reference to a mill for internal boring, facing or grooving tubular articles, although the invention is not limited to that use.

It is frequently necessary to bore, face, groove or otherwise shape internal surfaces for various purposes, and whereas vertical or horizontal boring mills are adaptable for such purposes, the setting up and adjusting operations are difficult and tedious, and the actual working time is disproportionately long.

In accordance with the present invention, an automatic boring mill is provided with an attachment for internal boring, facing, grooving or other shaping operations which are automatically performed in accordance with a primary movement of a feeding member to the end that one or more tools are progressively advanced to perform the desired operation without primary reliance on operational skill.

In a preferred embodiment of the invention particularly adapted for internally grooving the inner surface of a cylinder or tube, a primary feeding member is advanced axially of the work and is rotated within the work or the work is rotated coaxially therewith, or both the member and the work are rotated, as desired. The primary feeding member advances a rack cooperating with one or more substantially radially-arranged tools through the intermediary of a pinion and worm mechanism, whereby the tool or tools are progressively fed to the work as the tool and the work relatively rotate to perform the grooving operation. Preferably, two or more of such tools and their radial feeding mechanism, including the rack, pinion and worm mechanism, are provided so as to simultaneously cut the same or similar grooves as the primary feeding member is advanced. By equiangularly arranging virtually any number of such tools, numerous boring, facing, grooving or other operations may be performed simultaneously on the same work piece to accord with requirements.

It will be understood that feeding mechanisms equivalent to a rack and pinion or to a worm mechanism, or both, may be employed with equal facility, and that many changes may be made within the scope of the invention.

It will be seen that the automatic boring mill or an attachment for a boring mill, or similar rotary tool of this invention is capable of performing numerous operations simultaneously with facility and economy of labor and time to the end that complex shapes may be performed simply and in one operation.

For a more complete understanding of the invention, reference may be had to the accompanying drawings, in which.

Figure 1:
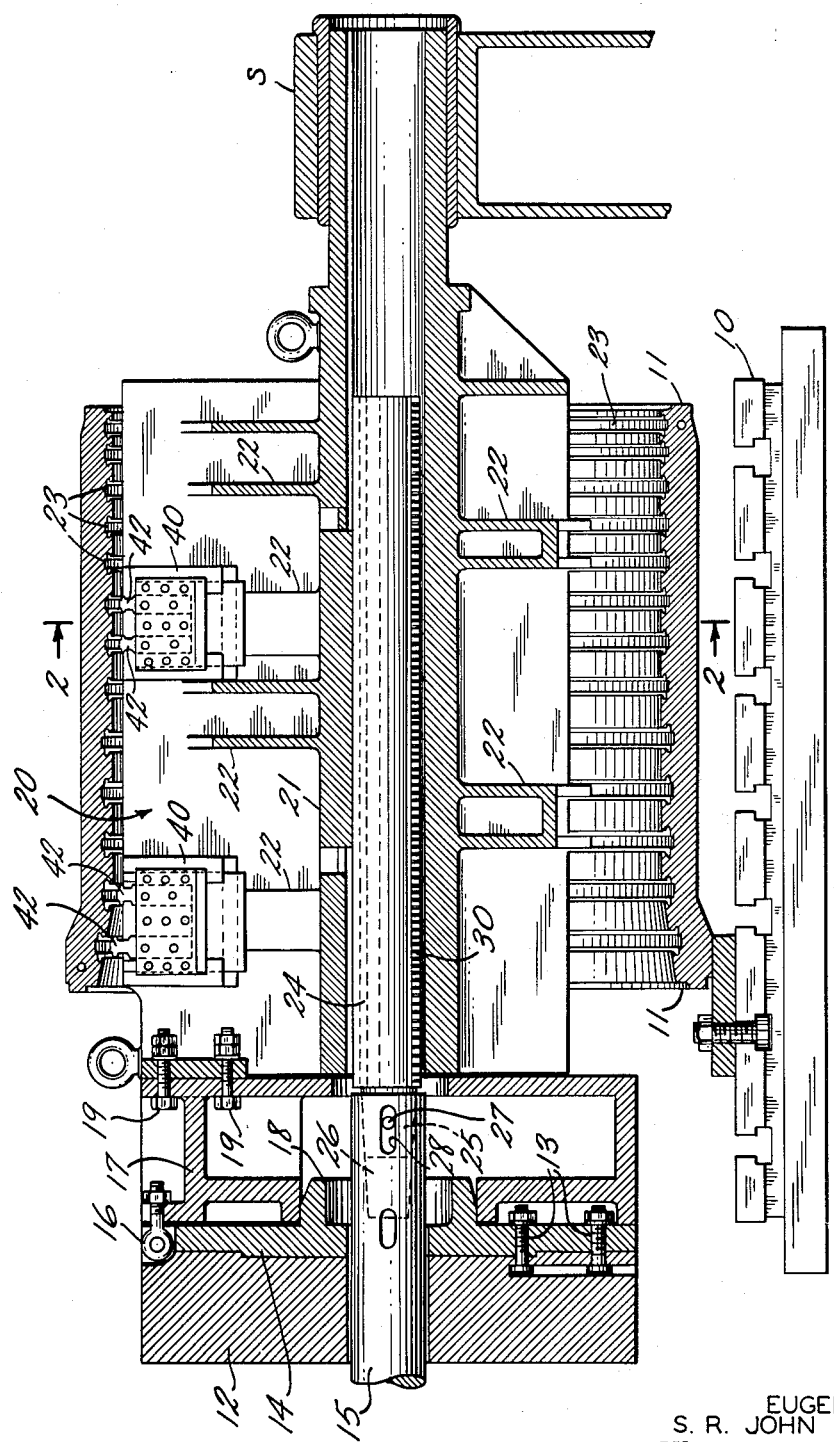
Figure 1 is an axial section through the boring mill improvement of this invention as seen along the line 1—1 of Fig. 2.

Referring to the drawings, numeral 10 designates the bed plate of a horizontal boring mill or equivalent mechanism for holding a hollow piece of work 11 which is to be internally faced, bored, grooved, or otherwise shaped, such as the tubular compressor casing shown in Fig. 1. The head stock or face plate 12 of the horizontal boring machine or other suitable apparatus, has secured thereto by bolts 13, a guide plate 14, through which extends the spindle 15 of the boring machine and which is advanced by conventional lead screw mechanism or its equivalent, to the right, as seen in Fig. 1.

Secured to guide plate 14 by pivoted bolts 16 carried thereby, only one of which is shown in Fig. 1, is the casting 17 which is centered on the hub 18 of the guide plate 14 and has a central opening for access to the socketed spindle 15 of the boring machine.

Figure 2:
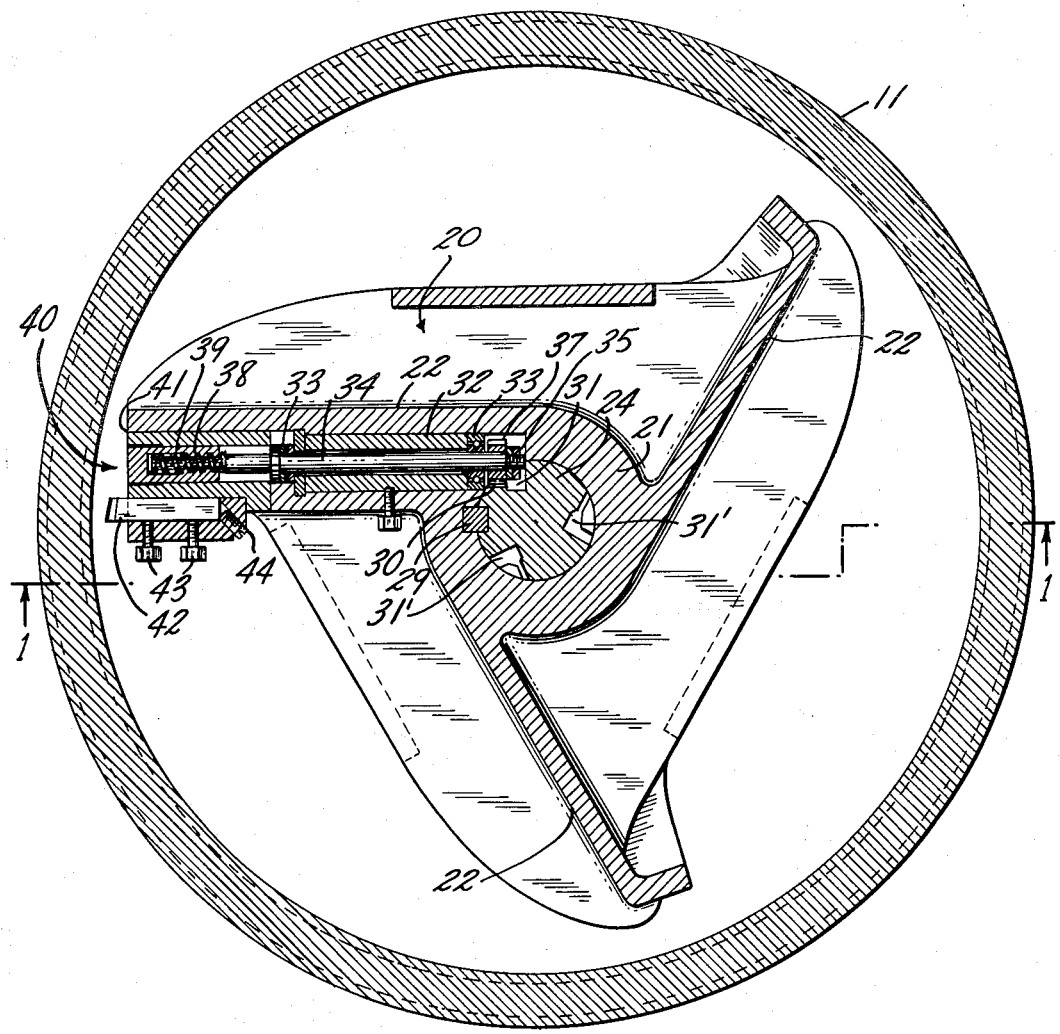
Fig. 2 is a transverse section therethrough as seen along the line 2—2 of Fig. 1.

Secured by bolts 19 to the outer end of the casting 17 is a generally cylindrical tool frame 20 having a triangular contour in cross-section as is best shown in Fig. 2. Tool frame 20 has a tubular hub 21 from which radiate a plurality of integral arms 22, spaced equiangularly radially for dynamic balance and also axially to accommodate a plurality of adjacent tools for each arm 22 which in turn are so arranged that between them, the tools may perform a number of cutting, shaping, boring or other facing operations simultaneously, such as the thirteen grooves 23 in the tubular casing 11 constituting the work as shown in Fig. 1. The right-hand end of the hub 21 extends beyond the body of the casting 20 and is journalled in the outer support S equivalent to a lathe tail stock and secured to the frame of the machine in the usual way.

Extending axially through the center of the hub 21 and slidable axially therein is a primary feeding member 24 which is provided at its inner end with the conical plug 25 which seats in the conical socket 26 of the boring machine spindle 15 and to which it is keyed or secured against rotary movement by the radial pin 27 extending through the longitudinal slot 28. Hence, as the boring mill spindle 15 is advanced to the left, as seen in Fig. 1, by its lead screw mechanism, primary feeding member 24 is likewise advanced to the right axially in and through the hub 21 of the tool frame 20. Although the primary feeding member 24 is advanced axially through the hub 21, it is non-rotatably secured thereto by the spline or key 29 (Fig. 2).

Figure 3:
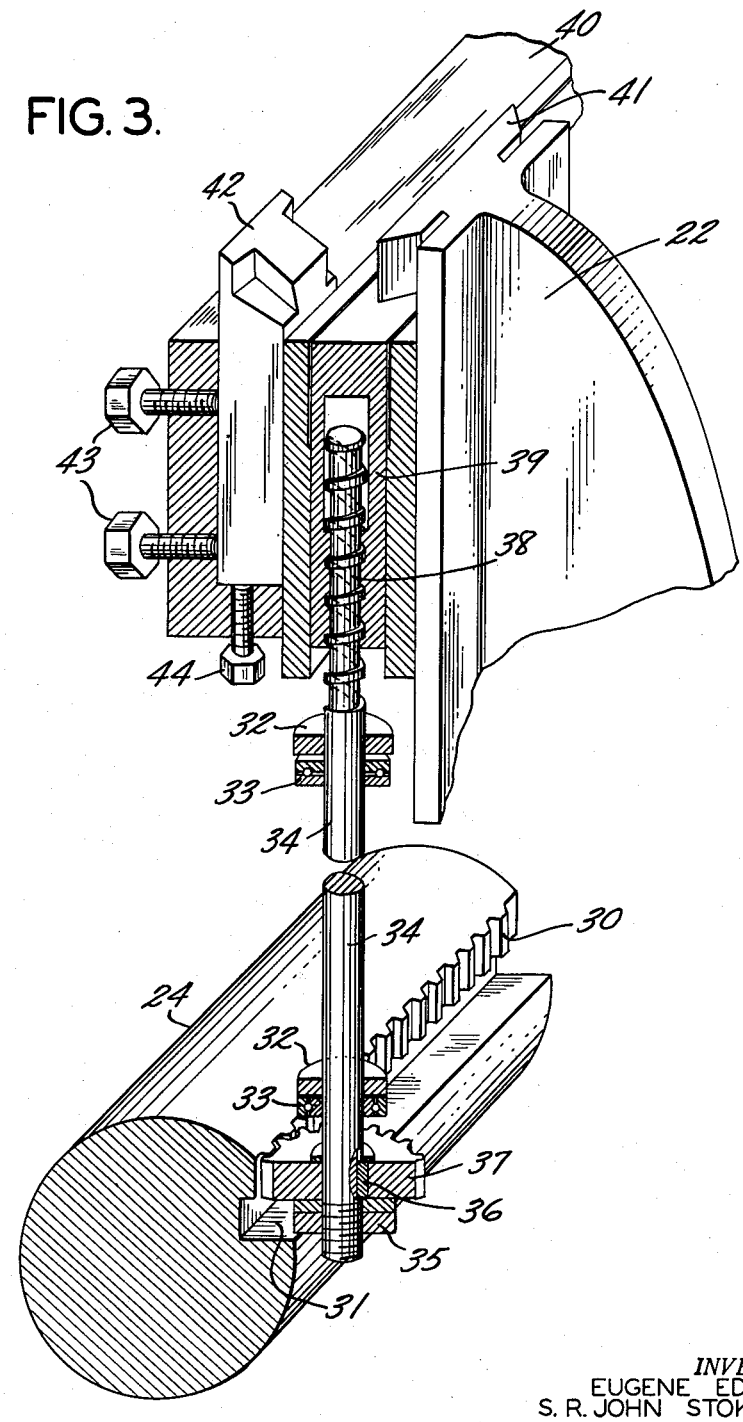
Fig. 3 is a perspective view of the tool feeding mechanism as seen from the rear of the tool handle with portions of the framework shown broken away to illustrate the tool feeding mechanism more clearly.

Primary feeding member 24 is provided with one or more racks 30 preferably formed by cutting rack teeth in the wall of a slot 31 formed axially in the surface of the primary feeding member 24 as shown particularly in Fig. 3, which illustrates one of such racks. Additional racks may be provided in the walls of corresponding slots 31', depending upon requirements.

The arms 22 which extend generally tangent to the periphery of hub 21 are hollow, and are provided with internal thrust collars 32 and corresponding thrust bearings 33 in which are journalled a spindle 34, having secured to its lower or inner end by nuts 35, a key 36 and pinion 37 which meshes with rack 30 so as to be rotated and correspondingly rotate the spindle 34 as the feeding member 24 carrying the rack 30, is advanced axially.

The upper or outer end of the spindle 34 is provided with a screw 38 such as the double thread or helical key shown in Fig. 2. The screw 38 cooperates with a correspondingly threaded socket in nut 39 forming part of the tool holder 40 which is slidably mounted on the arm 22 by means of the radial V-slide 41, shown especially in Fig. 3. The tool holder 40 is generally rectangular in shape, and is slotted for the reception of one or more tools 42 which are secured in the tool holder 40 by holding screws 43, and are adjusted to the predetermined position relatively to the work by means of an adjusting screw 44 which may be arranged at an angle as shown in Fig. 2, or longitudinally as shown in Fig. 3, and is adjusted before the holding screws 43 are tightened. Also, the adjusting screws 44 are used to compensate for tool wear. As shown particularly in Fig. 1, each tool holder 40 is provided with two tools 42, although each tool holder may carry but one tool, or more than two tools, depending upon requirements, and each tool may be different to perform different facing or shaping operations, as is indicated by the left-hand tool holder in Fig. 1 which carries tools of different radial positions and dimensions.

In operation of the boring mill or boring mill attachment of this invention and assuming that a tubular work piece is to be grooved in the manner shown in Fig. 1, the work is first secured in the proper position on the bed plate 10 of the machine in a conventional way, forming no part of the present invention, except that it must be aligned axially with the axis of spindle 15 of the boring machine or boring machine lathe drill or other apparatus adaptable for use with the invention. The frame 20 and the casting carrying it will then be accurately centered with respect to the work 11, and the tools 42 are adjusted in the tool holders 40 in accordance with the shaping, boring or facing operation they are required to peform, either simultaneously or in succession, depending upon requirements of the work 11.

After the work has been set up in the aforementioned manner, the spindle 15 is advanced by the lead screw mechanism of the machine and simultaneously rotates with the frame 20 while primary feed member 24 is moved to the right, as seen in Fig. 1. Assuming that three racks 30 are in mesh with the corresponding pinions 37 as indicated in Figs. 1 and 2, the axial movement of the feed member 24 causes rotation of the corresponding spindles 34. Such rotation of spindles 34 causes the screws 38 thereof, in cooperation with the nuts 39, to advance tool holders 40 in a general radial direction to engage the corresponding tools 42 with the internal surface of the work 11 in accordance with the sequence at which the tools 42 are set. Thus, assuming that all tools are set in the proper radial position in conformity with the internal contour of the work 11, all tools will simultaneously cut the grooves shown in Fig. 1. The depth of the grooves is determined by the axial distance that primary feeding member 24 is advanced to the right as seen in Fig. 1. By retracting spindle 15, and thereby the primary feeding member 24 so that the latter moves to the left, tool holders 40 are retracted radially by the corresponding reverse motion of the spindles 34, whereupon the work 11 may be dismounted and replaced by a new piece for repetition of the operation.

It will be understood that although the rack and pinion feeding mechanism illustrated in the drawings is preferred, equivalent feeding arrangements may be utilized with equal facility, and that by threading some of the screws 38 in a left-hand, and others in a right-hand direction, alternate shaping or facing operations can be conducted in any desired sequence which may also be effected by arranging screws 38 of different pitches. Alternatively, the pinions 37 may be of different pitch diameters to the same end. Furthermore, although a fixed work piece type of basic machine tool, such as a boring machine, is preferred, it is obvious that the invention is equally applicable for use with a rotary work piece 11 wherein the tool frame 20 remains stationary or rotates in the opposite direction from the direction of rotation of the work piece 11, all within the scope of the appended claims.

We claim:

1. In a machine tool having an axially movable tool driving means rotating relatively to a coaxial work piece, the combination of a plurality of tool holders adapted to mount a tool for engaging the internal surface of the work piece, a plurality of corresponding substantially radial guides therefor spaced axially and radially, a shaft movable axially and driven by said axial tool driving means, said shaft having a plurality of racks extending lengthwise thereof, a plurality of radial spindles, a pinion on each spindle meshing with one of said racks for rotating the corresponding said spindle, and an axially threaded connection between said spindle and said tool holders, whereby axial movement of said tool driving means advances said tool holders toward said work piece.

2. In a machine tool having an axially movable tool driving means rotating relatively to a coaxial work piece, the combination of a hub member having a plurality of substantially tangential arms thereon rotated by said driving means, a plurality of tool holders mounted on said arms to receive a tool for movement of the tool radially into and out of engagement with the internal surface of the work piece, a plurality of corresponding substantially radial guides for said holders on said arms, a shaft having a plurality of racks formed thereon and movable axially of said hub and rotatable with said hub, a plurality of radial spindles corresponding to said guides, a pinion on each of said spindles meshing with one of said racks for rotating said spindles, and a driving connection between each of said spindles and the corresponding said tool holder, whereby axial movement of said shaft advances each of said tool holders toward said work piece.

3. In a machine tool having an axially movable tool driving means rotating relatively to a coaxial work piece, the combination of a hub rotated by said tool driving means and having a plurality of substantially equi-angularly spaced arms extending substantially tangentially from said hub, a plurality of tool holders, each adapted to mount a tool for movement of said tool substantially radially into engagement with the internal surface of the work piece, a guide on each of said arms for slidably supporting a tool holder, a spindle extending along each arm between said hub and said tool holder for each arm, a primary feed member extending and movable axially of said hub, a rack and pinion connection between said primary feed member and said corresponding spindle, and a screw threaded driving connection between said corresponding spindle and said corresponding tool holder, whereby axial movement of said primary feed member advances and retracts said tool holders relative to said work piece.

4. The machine tool set forth in claim 3, comprising reinforcing webs extending between said arms substantially perpendicular to the axis of said hub.

References Cited in the file of this patent

UNITED STATES PATENTS

| | | |
|---|---|---|
| 818,294 | Riddell | Apr. 17, 1906 |
| 881,775 | Coon | Mar. 10, 1908 |
| 1,363,003 | McGrath | Dec. 21, 1920 |
| 1,424,489 | Kriesel | Aug. 1, 1922 |
| 2,350,778 | Lang | June 6, 1944 |
| 2,404,433 | Christman | July 23, 1946 |